United States Patent
Katakura (10) Patent No.: US 6,949,051 B2
(45) Date of Patent: Sep. 27, 2005

(54) MULTISTAGE AUTOMATIC TRANSMISSION

(75) Inventor: Takeji Katakura, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 55 days.

(21) Appl. No.: 10/768,661

(22) Filed: Feb. 2, 2004

(65) Prior Publication Data

US 2004/0154420 A1 Aug. 12, 2004

(30) Foreign Application Priority Data

Feb. 5, 2003 (JP) ........................................ 2003-027728

(51) Int. Cl.[7] ........................... B60K 41/02; F16H 59/00
(52) U.S. Cl. ......................... 477/175; 477/70; 477/180; 74/336 R
(58) Field of Search ........................ 477/70, 175, 180; 74/335–336 R (56) References Cited

U.S. PATENT DOCUMENTS

| | | | | |
|---|---|---|---|---|
| 4,790,418 A | * | 12/1988 | Brown et al. ................. | 701/51 |
| 6,286,381 B1 | * | 9/2001 | Reed et al. ................ | 74/336 R |
| 6,463,821 B1 | * | 10/2002 | Reed et al. .................... | 74/330 |
| 6,679,134 B2 | * | 1/2004 | Shigyo ...................... | 74/336 R |
| 6,869,382 B2 | * | 3/2005 | Leising et al. ................. | 477/77 |
| 6,881,171 B2 | * | 4/2005 | Kuhstrebe et al. ............ | 477/78 |
| 6,887,184 B2 | * | 5/2005 | Buchanan et al. .......... | 477/174 |

FOREIGN PATENT DOCUMENTS

| | | |
|---|---|---|
| JP | 11-82729 A | 3/1999 |
| JP | 11-201271 A | 7/1999 |
| JP | 2001-295898 A | 10/2001 |

* cited by examiner

*Primary Examiner*—Tisha Lewis
(74) *Attorney, Agent, or Firm*—Foley & Lardner LLP (57) ABSTRACT

A device is provided that issues a vehicle speed signal representative of a vehicle speed. A control unit is configured to carry out when, upon the transmission assuming the second speed, the vehicle speed represented by the vehicle speed signal becomes equal to or lower than a first predetermined speed, starting operation for fully releasing the engaged condition of the first clutch; when thereafter the vehicle speed becomes equal to or lower than a second predetermined speed that is lower than the first predetermined speed, starting operation for releasing the engaged condition of the second clutch; and when thereafter the vehicle speed becomes equal to or lower than a third predetermined speed that is lower than the second predetermined speed, starting operation for fully releasing the engaged condition of the second clutch and starting operation for engaging the first clutch from the fully released condition of the same.

7 Claims, 5 Drawing Sheets

2→1 DOWNSHIFT

TIME ELAPSED

MULTISTAGE AUTOMATIC TRANSMISSION

BACKGROUND OF THE INVENTION

1. Field of the Invention

The present invention relates in general to multistage automatic transmissions for wheeled motor vehicles, and more particularly to the multistage automatic transmissions of a constant-mesh type. More specifically, the present invention is concerned with the multistage automatic transmission having a speed change control system incorporated therewith.

2. Description of the Related Art

In order to clarify the task of the present invention, one of such automatic transmissions will be briefly described, which is disclosed in Japanese Laid-open Patent Application (Tokkai) 2001-295898. In this disclosed transmission, there are arranged first and second concentric input shafts, synchromesh gear pairs, a first clutch for establishing connection/disconnection between an associated engine and the first input shaft, and a second clutch for establishing connection/disconnection between the engine and the second input shaft. The gear change is carried out by suitably switching ON/OFF operation of the first and second clutches. In this transmission, there are further provided mechanisms by which the ON/OFF operation of the first and second clutches and a gear selection operation are automatically made.

SUMMARY OF THE INVENTION

In the above-mentioned known transmission, like in the conventional transmissions, a gear-to-gear ratio between the first and second speeds is set larger than that between other speeds in view of expected power and fuel consumption performances. Thus, upon downshift operation from the second speed to the first speed, the deceleration shock felt by passengers is higher than that in other downshift operations. This is because the rotation speed gap of the input shaft or shafts and an inertia force of the engine show marked values at such downshift operation.

When a clutch is about to engage for carrying out a speed change, it is necessary to synchronize the speed of the input shaft with an engine speed. If a downshift is intended at a higher vehicle speed, it becomes necessary to increase the engine speed. However, in this case, due to the increased engine speed, remarked engine noise is inevitably produced. Usually, the driver doesn't mind the above-mentioned noise and deceleration shock when these things are induced by his or her speed change manipulation. However, when such noise and deceleration shock are produced due to an automatic operation of the transmission without a driver's intention, he or she tends to mind such undesired things. One measure to solve such drawbacks is to reduce the vehicle speed when the downshift is carried out. However, in this case, the engine speed at the second speed is too lowered, and thus, engine stall tends to take place. Another measure for solving such drawbacks is to inhibit a downshift to the first speed during cruising of the vehicle. However, as is easily known, this measure is not a practical measure.

Accordingly, it is an object of the present invention to a multistage automatic transmission, which is free of the above-mentioned drawbacks.

According to the present invention, there is provided a multistage automatic transmission, which, upon downshift operation from the second speed to the first speed by the driver, carries out a smoothed downshifting of the transmission without deteriorating the running performance of the associated motor vehicle.

According to a first aspect of the present invention, there is provided a multistage automatic transmission for use in a motor vehicle, which comprises first and second clutches each selectively establishing and disestablishing a torque transmission path from an engine; a first input shaft connected to the first clutch and having a first speed drive gear tightly mounted thereon; a second input shaft coaxially arranged with the first input shaft and connected to the second clutch, the second input shaft having a second speed drive gear rotatably mounted thereon; an output shaft extending in parallel with the first and second input shafts, the output shaft having a first speed driven gear rotatably mounted thereon and a second speed driven gear tightly mounted thereon, the first and second speed driven gears being meshed with the first and second speed drive gears respectively; a first shift clutch for uniting the first speed driven gear with the output shaft when actuated; a second shift clutch for uniting the second speed drive gear with the second input shaft when actuated; and a control system for controlling the first and second clutches and the first and second shift clutches to provide the transmission with a desired speed, the control system providing the transmission with the first speed by engaging the first clutch and actuating the first shift clutch and with the second speed by engaging the second clutch and actuating the second shift clutch, wherein the control system comprises a device that issues a vehicle speed signal representative of a vehicle speed; and a control unit which is configured to carry out when, upon the transmission assuming the second speed, the vehicle speed represented by the vehicle speed signal becomes equal to or lower than a first predetermined speed, starting operation for fully releasing the engaged condition of the first clutch; when thereafter the vehicle speed becomes equal to or lower than a second predetermined speed that is lower than the first predetermined speed, starting operation for releasing the engaged condition of the second clutch; and when thereafter the vehicle speed becomes equal to or lower than a third predetermined speed that is lower than the second predetermined speed, starting operation for fully releasing the engaged condition of the second clutch and starting operation for engaging the first clutch from the fully released condition of the same.

According to a second aspect of the present invention, there is provided a multistage automatic transmission for use in a motor vehicle, which comprises first and second clutches each selectively establishing and disestablishing a torque transmission path from an engine; a first input shaft connected to the first clutch and having a first speed drive gear tightly mounted thereon; a second input shaft coaxially arranged with the first input shaft and connected to the second clutch, the second input shaft having a second speed drive gear rotatably mounted thereon; an output shaft extending in parallel with the first and second input shafts, the output shaft having a first speed driven gear rotatably mounted thereon and a second speed driven gear tightly mounted thereon, the first and second speed driven gears being meshed with the first and second speed drive gears respectively; a first shift clutch for uniting the first speed driven gear with the output shaft when actuated; a second shift clutch for uniting the second speed drive gear with the second input shaft when actuated; and a control system for controlling the first and second clutches and the first and second shift clutches to provide the transmission with a desired speed, the control system providing the transmission with the first speed by engaging the first clutch and actuating the first shift clutch and with the second speed by engaging the second clutch and actuating the second shift clutch, wherein the control system comprises a device that issues a vehicle speed signal representative of a vehicle speed; and a control unit which is configured to carry out when, upon the transmission assuming the second speed, the vehicle speed represented by the vehicle speed signal becomes equal to or lower than a first predetermined speed, starting operation for fully releasing the engaged condition of the first clutch; when the engaged condition of the first clutch is fully released, actuating the first shift clutch to unite the first speed driven gear with the output shaft; when thereafter the vehicle speed becomes equal to or lower than a second predetermined speed that is lower than the first predetermined speed, starting operation for releasing the engaged condition of the second clutch; and when thereafter the vehicle speed becomes equal to or lower than a third predetermined speed that is lower than the second predetermined speed, starting operation for fully releasing the engaged condition of the second clutch and starting operation for engaging the first clutch from the fully released condition of the same.

DETAILED DESCRIPTION OF THE EMBODIMENT

Figure 1:
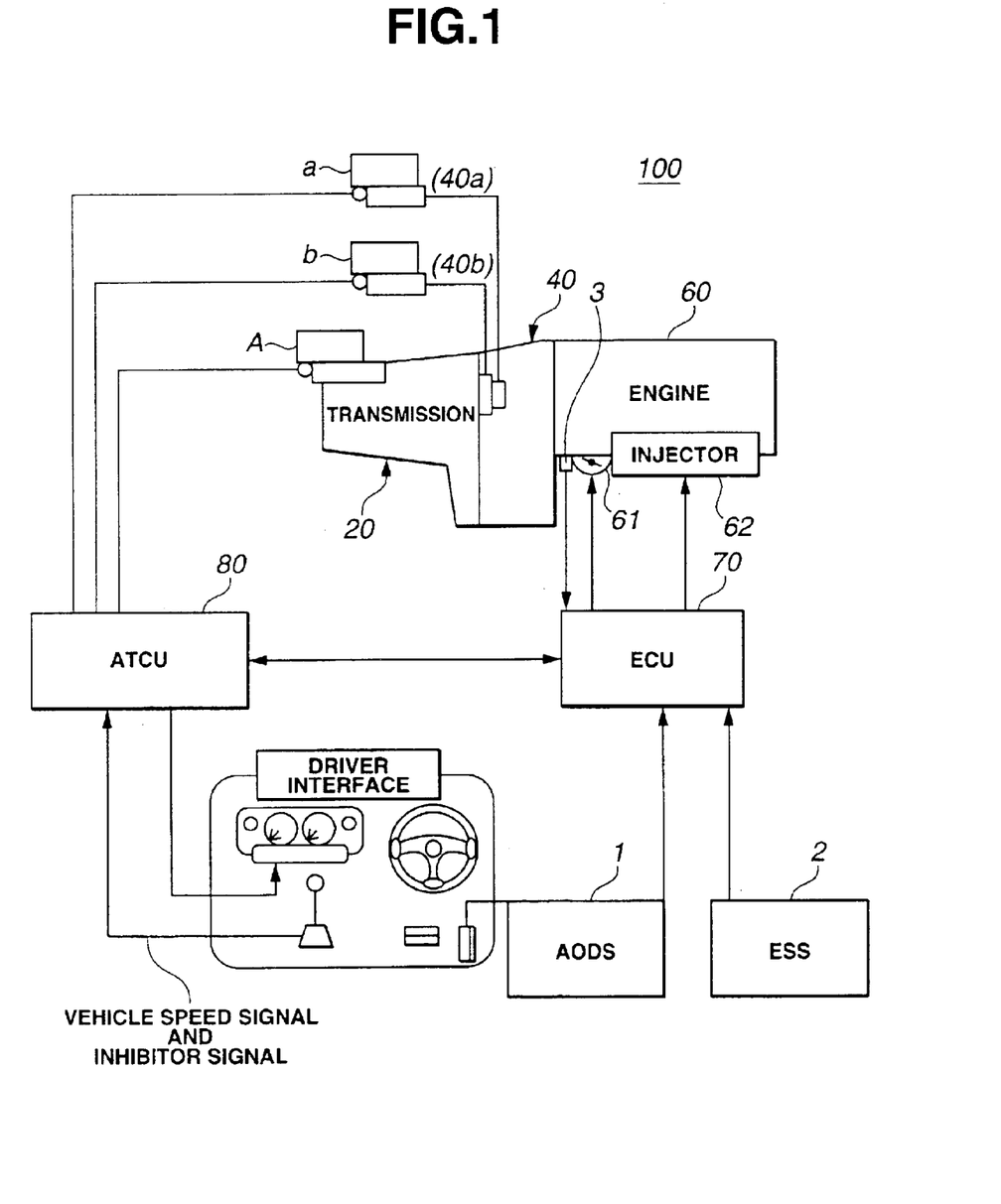
FIG. 1 is a schematic diagram showing a speed change control system that is operatively applied to a multistage automatic transmission, which is an embodiment of the present invention.

Referring to FIG. 1 of the drawings, there is schematically shown a speed change control system 100 that is operatively applied to a multistage automatic transmission, which is an embodiment of the present invention.

In the drawing, denoted by numeral 60 is an engine, such as an internal combustion engine. Engine 60 has at its intake section an electronically controlled throttle 61 that electronically controls a throttle opening of an air intake passage. Engine 60 has also fuel injectors 62 each being exposed to a cylinder of engine 60 for injecting fuel thereinto. A multistage automatic transmission 20 is connected to an output shaft of engine 60 through an electromagnetic clutch 40. Engine 60 is controlled by an engine control unit (ECU) 70, and transmission 20 is controlled by a transmission control unit (ATCU) 80. Each of the control units 70 and 80 has a micro-computer that includes CPU (central processing unit), RAM (random access memory), ROM (read only memory, and input and output interfaces.

As shown, an accelerator open degree sensor (AODS) 1, an engine speed sensor (ESS) 2 and a throttle open degree sensor 3 feed engine control unit 70 with corresponding information signals. Transmission control unit 80 is fed with a vehicle speed signal and a range signal (inhibitor signal). The range signal is a signal that represents the range that has been just selected by the driver. Engine control unit 70 and transmission control unit 80 are electrically connected to exchange information signals.

Upon processing the information signals fed thereto, engine control unit 70 issues control signals for controlling the throttle opening and the amount of fuel injected to each cylinder. Like this, upon processing the information signals fed thereto, transmission control unit 80 issues control signals for controlling a speed change actuator "A" and two clutch actuators "a" and "b" of electromagnetic clutch 40.

Figure 2:
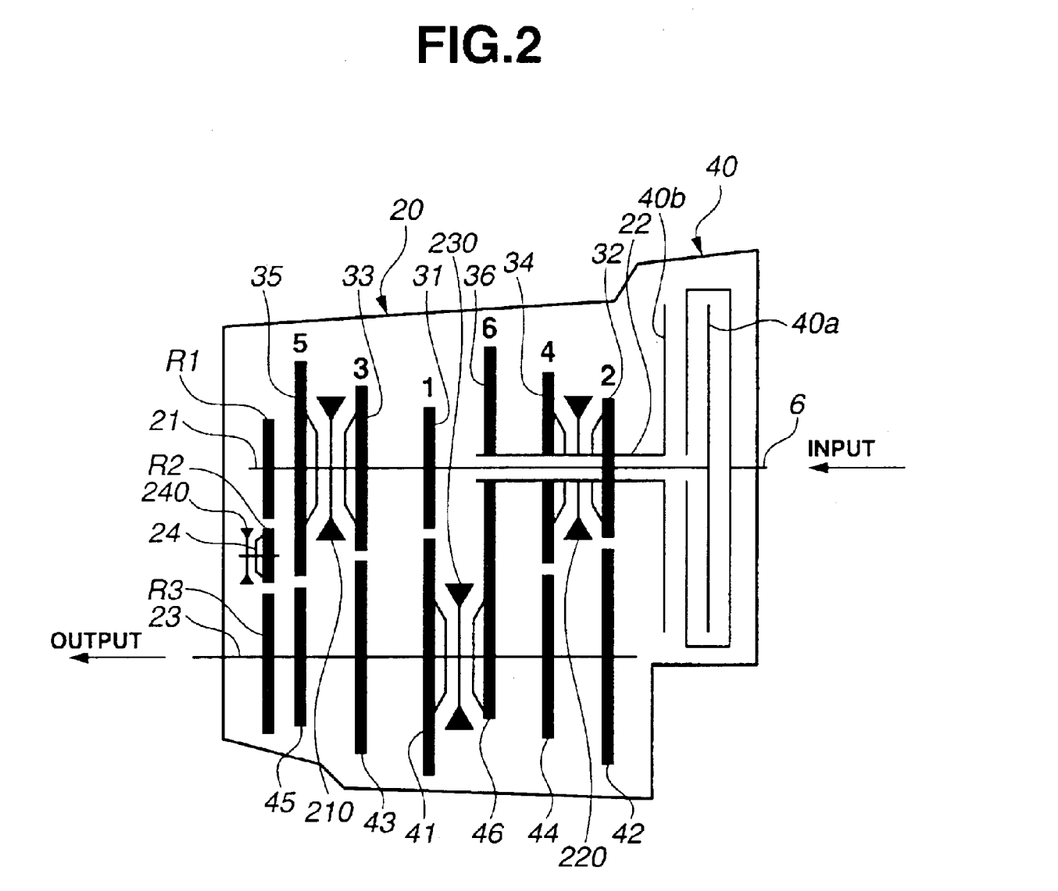
FIG. 2 is a schematic view of the multistage automatic transmission that is controlled by the speed change control system.

Referring to FIG. 2, there is schematically shown the multistage automatic transmission 20. Transmission 20 has electromagnetic clutch 40 operatively connected thereto.

Electromagnetic clutch 40 is of a twin type comprising a first clutch 40a which carries out engagement/disengagement between a first input shaft 21 and an engine output shaft 6 with the aid of clutch actuator "a" (see FIG. 1), and a second clutch 40b which carries out engagement/disengagement between a second input shaft 22 and engine output shaft 6 with the aid of the other clutch actuator "b" (see FIG. 1).

Disposed about first input shaft 21 are first, third and fifth speed drive gears 31, 33 and 35 and a first reverse gear R1. First speed drive gear 31 and first reverse gear R1 are integral with first input shaft 21, while third and fifth speed drive gears 33 and 35 are rotatably disposed on first input shaft 21.

Rotatably disposed about first input shaft 21 is a second input shaft 22. Disposed about second input shaft 22 are second, fourth and sixth speed drive gears 32, 34 and 36. Sixth speed drive gear 36 is integral with second input shaft 22 to rotate therewith, while second and fourth speed drive gears 32 and 34 are rotatably disposed about second input shaft 22.

An output shaft 23 and an auxiliary shaft 24 extend beside and in parallel with first and second input shafts 21 and 22. Disposed about output shaft 23 are first, second, third, fourth, fifth and sixth speed driven gears 41, 42, 43, 44, 45 and 46 and a third reverse gear R3. Second, third, fourth and fifth speed driven gears 42, 43, 44 and 45 and third reverse gear R3 are integral with output shaft 23 to rotate therewith, while, first and sixth speed driven gear 41 and 46 are rotatably disposed about output shaft 23.

Rotatably disposed about auxiliary shaft 24 is a second reverse gear R2.

Disposed on first input shaft 21 is a 3–5 shift clutch 210 that carries out engagement/disengagement between third speed drive gear 33 and first input shaft 21 and/or that between fifth speed drive gear 35 and first input shaft 21.

Disposed on second input shaft 22 is a 2–4 shift clutch 220 that carries out engagement/disengagement between second speed drive gear 32 and second input shaft 22 and/or that between fourth speed drive gear 34 and second input shaft 22.

Disposed on output shaft 23 is a 1–6 shift clutch 230 that carries out engagement/disengagement between first speed driven gear 41 and output shaft 23 and/or that between sixth speed driven gear 46 and output shaft 23.

Disposed on auxiliary shaft 24 is a reverse clutch 240 that takes both an engaged condition wherein second reverse gear R2 is meshed with both first and third reverse gears R1 and R3 and a disengaged condition wherein second reverse gear R2 is released from both first and third reverse gears R1 and R3. 3–5 shift clutch 210, 2–4 shift clutch 220, 1–6 shift clutch 230 and reverse shift clutch 240 are actuated by speed change actuator "A" (see FIG. 1). That is, upon receiving a speed change instruction, each shift clutch 210, 220, 230 or 240 effects the engagement or disengagement for providing a torque transmission path that is needed.

In the following, various torque transmission paths provided by multistage automatic transmission 20 will be described. Under cruising, that is, when the associated motor vehicle is moving without carrying out the speed change, both first and second clutches 40a and 40b assume the engaged condition and a torque transmission is effected through either one of the first and second clutches 40a and 40b.

[Neutral Condition]

In this condition, both first and second clutches 40a and 40b are in their disengaged condition. It is to be noted that the neutral condition is also achieved even when first and second clutches 40a and 40b assume their engaged condition so long as the shift clutches 210, 220, 230 and 240 are in their neutral positions.

[First Speed]

First clutch 40a is operatively engaged, and by 1–6 shift clutch 230, first speed driven gear 41 is united with output shaft 23. Under this condition, the engine torque from the engine is transmitted to first clutch 40a, first input shaft 21, first speed drive gear 31, first speed driven gear 41 and output shaft 23 and then to a final reduction gear (not shown).

[Second Speed]

Second clutch 40b is operatively engaged, and by 2–4 shift clutch 220, second speed drive gear 32 is united with second input shaft 22. Under this condition, the engine torque from the engine is transmitted to second clutch 40b, second input shaft 22, second speed drive gear 32, second speed driven gear 42 and output shaft 23 and then to the final reduction gear (not shown).

[Third Speed]

First clutch 40a is operatively engaged, and by 3–5 shift clutch 210, third speed drive gear 33 is united with first input shaft 21. Under this condition, the engine torque from the engine is transmitted to first clutch 40a, first input shaft 21, third speed drive gear 33, third speed driven gear 43 and output shaft 23 and then to the final reduction gear (not shown).

[Fourth Speed]

Second clutch 40b is operatively engaged, and by 2–4 shift clutch 220, fourth speed drive gear 34 is united with second input shaft 22. Under this condition, the engine torque from the engine is transmitted to second clutch 40b, second input shaft 22, fourth speed drive gear 34, fourth speed driven gear 44 and output shaft 23 and then to the final reduction gear (not shown).

[Fifth Speed]

First clutch 40a is operatively engaged, and by 3–5 shift clutch 210, fifth speed drive gear 35 is united with first input shaft 21. Under this condition, the engine torque from the engine is transmitted to first clutch 40a, first input shaft 21, fifth speed drive gear 35, fifth speed driven gear 45 and output shaft 23 and then to the final reduction gear (not shown).

[Sixth Speed]

Second clutch 40b is operatively engaged, and by 1–6 shift clutch 230, sixth speed driven gear 46 is united with output shaft 23. Under this condition, the engine torque from the engine is transmitted to second clutch 40b, second input shaft 22, sixth speed drive gear 36, sixth speed driven gear 46 and output shaft 23 and then to the final reduction gear (not shown).

[Reverse Condition]

First clutch 40a is operatively engage, and by reverse clutch 240, second reverse gear R2 is meshed with both first and third reverse gears R1 and R3. Under this condition, the engine torque from the engine is transmitted to first clutch 40a, first input shaft 21, first reverse gear R1, second reverse gear R2, third reverse gear R3 and output shaft 23 and to the final reduction gear (not shown).

Figure 3:
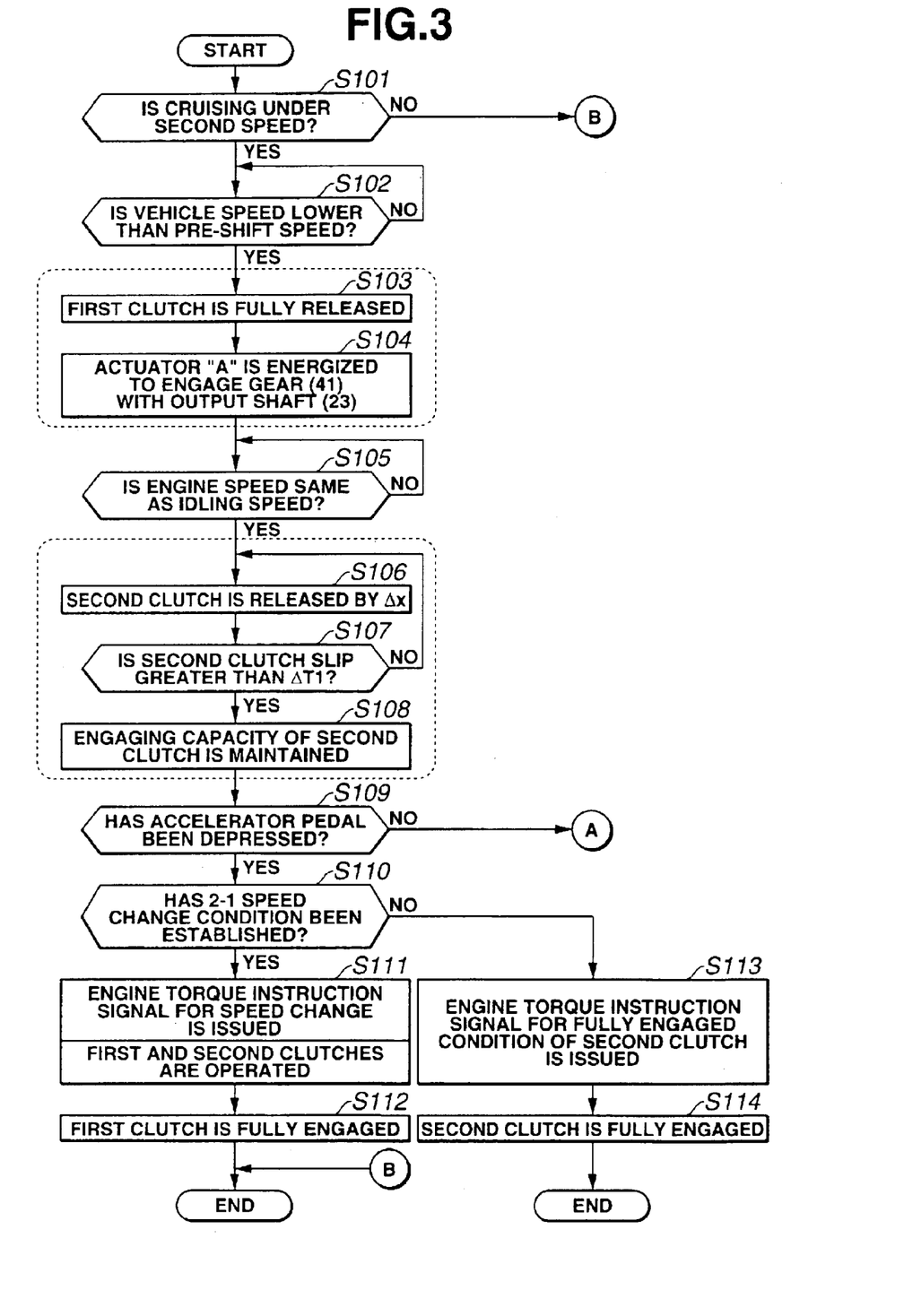
FIG. 3 is a flowchart showing a main part of programmed operation steps executed by a control unit when a downshift from the second speed to the first speed is carried out.
Figure 4:
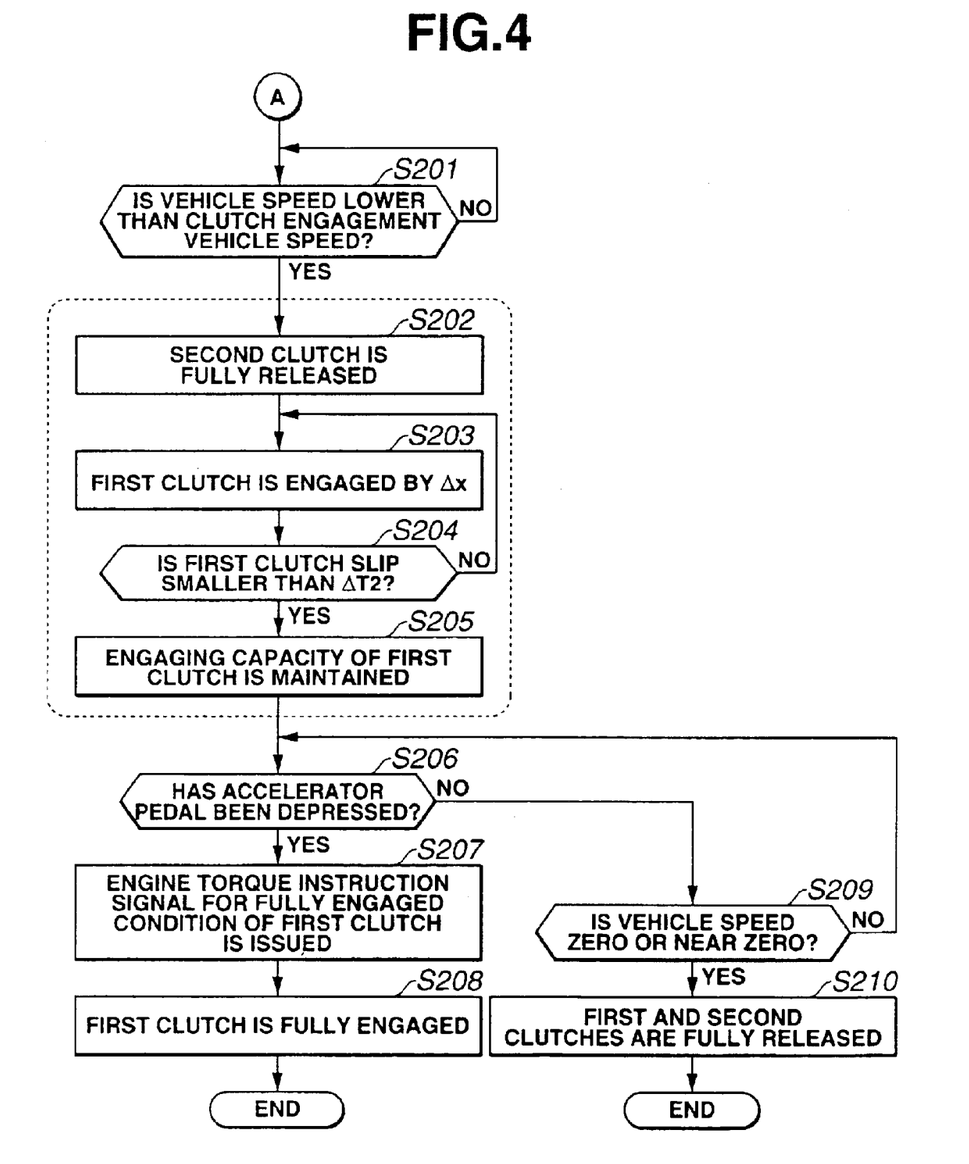
FIG. 4 is a flowchart showing an auxiliary part of the programmed operation steps.

Referring to FIGS. 3 and 4, there are shown flowcharts showing programmed operation steps that are executed by transmission control unit (ATCU) 80 when a downshift from the second speed to the first speed is carried out.

As has been mentioned hereinabove, in the second speed, second clutch 40b is operatively engaged, and by 2–4 shift clutch 220 (that is, by moving this clutch 220 rightward in FIG. 2), second speed drive gear 32 is united with second input shaft 22. Of course in this case, other shift clutches 210, 230 and 240 are in their neutral conditions. While, in the first speed, first clutch 40a is operatively engaged, and by 1–6 shift clutch 230 (that is, by moving this clutch 230 leftward in FIG. 2), first speed driven gear 41 is united with output shaft 23.

Accordingly, for achieving the downshift from the second speed to the first speed, leftward movement of 2–4 shift clutch 220 to neutral position and leftward movement of 1–6 shift clutch 230 from neutral position to one engaged position are needed.

Referring back to the flowchart of FIG. 3, at step S101, judgment is carried out as to whether the current cruising of the vehicle is under the second speed or not. If NO, that is, when the current cruising is not under the second speed, the operation flow goes to END to stop the control. While, if YES, that is, when the current cruising is under the second speed, the operation flow goes to step S102.

At step S102, judgment is carried out as to whether the current vehicle speed is equal to or lower than a pre-shift vehicle speed "V1" for 2->1 speed change or not. It is to be noted that the pre-shift vehicle speed "V1" for 2->1 speed change is a speed that is basically needed for the 2->1 speed change. If NO, that is, when the current vehicle speed is higher than the pre-shift vehicle speed "V1", the operation flow returns back to an input part of this step S102. If YES, that is, when the current vehicle speed is lower than the pre-shift vehicle speed "V1", the operation flow goes to step S103.

At step S103, first clutch 40a (see FIG. 2) is fully disengaged or released.

At step S104, speed change actuator "A" is energized to move 1–6 shift clutch 230 leftward in FIG. 2 to engage first speed driven gear 41 with output shaft 23. However, because of the disengaged condition of first clutch 40a, the engagement of first speed driven gear 41 with output shaft 23 does not induce the torque transmission from the engine to output shaft 23.

At step S105, judgment is carried out as to whether the current engine speed is generally the same as an idling speed of the engine or not. If NO, that is, when the current engine speed is not the same as the idling speed, the operation flow returns back to an input part of this step S105. While, if YES, that is, when the current engine speed is generally the same as the idling speed, the operation flow goes to step S106.

At step S106, second clutch 40b is released by a degree of "ΔX". Then, operation flow goes to step S107.

At step S107, judgment is carried out as to whether a slip degree of second clutch 40b is equal to or greater than a predetermined degree "ΔT1" or not. If NO, that is, when the slip degree of second clutch 40b is smaller than the predetermined degree "ΔT1", the operation flow returns back to step S106. If YES, that is, when the slip degree is equal to or greater than the predetermined degree "ΔT1", the operation flow goes to step S108.

At step S108, an engaging capacity of second clutch 40b is maintained. Then, the operation flow goes to step S109.

At step S109, judgment is carried out as to whether an accelerator pedal has been depressed or not. If NO, that is, when the accelerator pedal has not been depressed, the operation flow goes to step S201 of the auxiliary part of the flowchart of FIG. 4, which will be described in detail hereinafter. If YES, that is, when the accelerator pedal has been depressed, the operation flow goes to step S110.

At step S110, judgment is carried out as to whether a condition suitable for 2->1 speed change (or 2->1 downshift speed change) has been established or not. If NO, that is, when such condition has not been established, the operation flow goes to S113 which will be described in detail hereinafter. While, if YES, that is, when such condition has been already established, the operation flow goes to step S111.

At step S111, transmission control unit (ATCU) 80 issues to engine control unit (ECU) 70 an instruction signal representative of an engine torque needed at the speed change, and an engaging capacity of first clutch 40a is gradually increased and at the same time, the engaging capacity of second clutch 40b is gradually decreased. Then, the operation flow goes to step S112.

At step S112, first clutch 40a is fully engaged.

As has been mentioned hereinabove, if NO at step S110, that is, when the condition suitable for the 2->1 speed change has not been established, the operation flow goes to step S113.

At step S113, transmission control unit (ATCU) 80 issues to engine control unit (ECU) 70 an instruction signal representative of an engine torque provided when second clutch 40b is fully engaged. That is, under such condition, the 2->1 speed change is not actually carried out. Then, the operation flow goes to step S114.

At step S114, second clutch 40b is fully engaged.

As has been mentioned hereinabove, if NO at step S109, that is, when the accelerator pedal has not been depressed, the operation flow goes to step S201 of the flowchart of FIG. 4.

At step S201, judgment is carried out as to whether the current vehicle speed is equal to or lower than a clutch engagement vehicle speed "V3" for the 2->1 speed change or not. If NO, that is, when the current vehicle speed is higher than the clutch engagement vehicle speed "V3" for the 2->1 speed change, the operation flow returned back to an input part of step S201. While, if YES, that is, when the current vehicle speed is equal to or lower than the clutch engagement vehicle speed "V3" for the 2->1 speed change, the operation flow goes to step S202.

At step S202, second clutch 40b is fully released or disengaged. Then, operation flow goes to step S203.

At step S203, first clutch 40a is engaged by a degree of "ΔX". Then, operation flow goes to step S204.

At step S204, judgment is carried out as to whether a slip degree of first clutch 40a is equal to or smaller than a predetermined degree "ΔT2" or not. If NO, that is, when the slip degree of first clutch 40a is larger than the predetermined degree "ΔT2", the operation flow returns to step S203. While, if YES, that is, when the slip degree is equal to or smaller than the predetermined degree "ΔT2", the operation flow goes to step S205.

At step S205, the engaging capacity of first clutch 40a is maintained. Then, the operation flow goes to step S206.

At step S206, judgment is carried out as to whether the accelerator pedal has been depressed or not. If NO, that is, when the accelerator pedal has not been depressed, the operation flow goes to step S209 which will be described hereinafter. While, if YES, that is, when the accelerator pedal has been depressed, the operation flow goes to step S207.

At step S207, transmission control unit (ATCU) 80 issues to engine control unit (ECU) 70 an instruction signal representative of an engine torque provided when first clutch 40a is fully engaged. Then, the operation flow goes to step S208.

At step S208, first clutch 40a is fully engaged.

As has been mentioned hereinabove, if NO at step S206, that is, when the accelerator pedal has not been depressed, the operation flow goes to step S209.

At step S209, judgment is carried out as to whether or not the current vehicle speed has come to a very low speed or zero. If NO, that is, when the current vehicle speed has not come to such very low speed, the operation flow returns to step S206. While, if YES, that is, when the current vehicle speed has come to such very low speed or zero, the operation flow goes to step S210.

At step S210, both first and second clutches 40a and 40b are fully released or disengaged.

Figure 5:
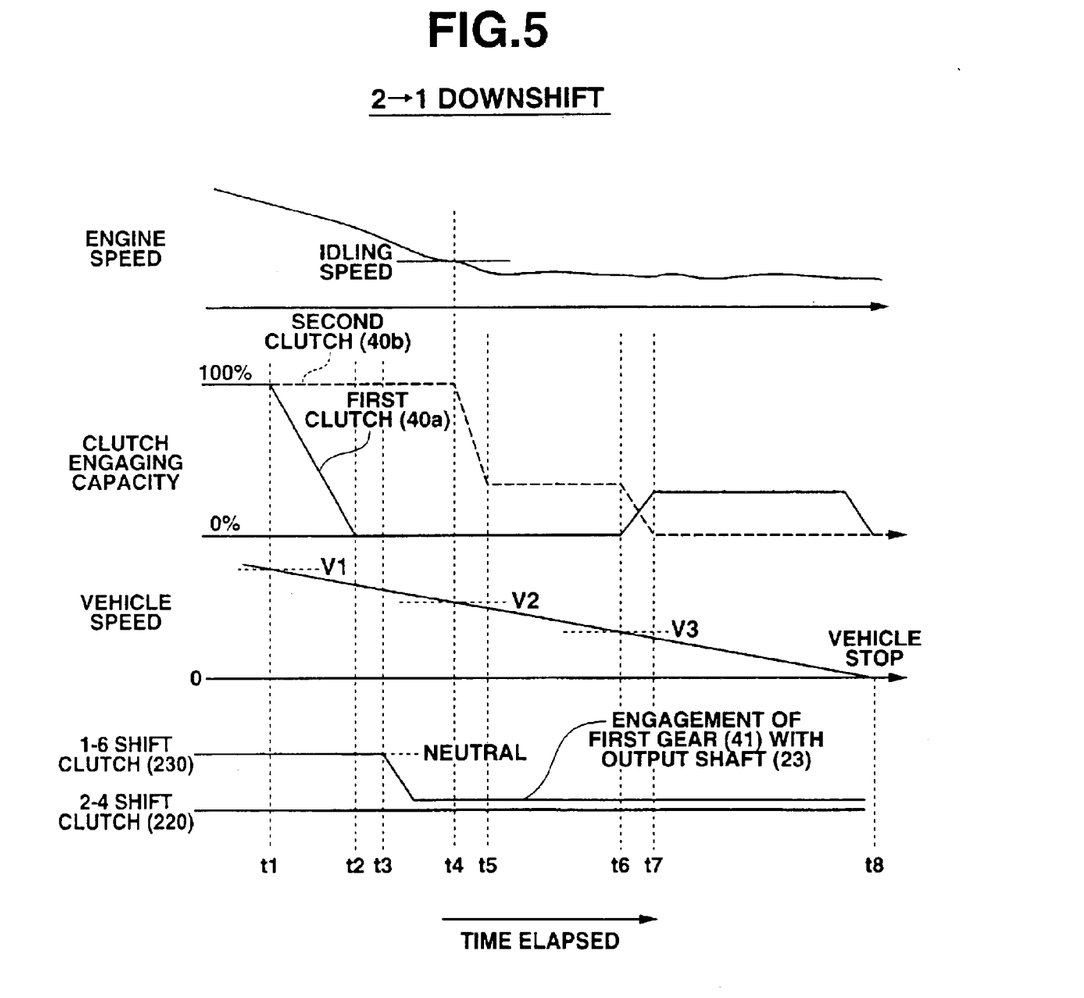
FIG. 5 is a time chart pictorially showing the control of the second to first downshift of the multistage automatic transmission of the embodiment.

Referring to FIG. 5, there is shown a flowchart that pictorially shows the control of the 2->1 speed downshift in a case wherein depression of the accelerator pedal does not take place and finally the associated motor vehicle stops. More specifically, the control shown by the flowchart of FIG. 5 appears when the operation steps flow through steps S101, S102, S103, S104, S105, S106, S107, S108, S109, S201, S202, S203, S204, S205, S206, S209 and S210 of the flowcharts of FIGS. 3 and 4.

Under cruising of the vehicle at the second speed of the transmission, second clutch 40b is operatively engaged and 2–4 shift clutch 220 establishes the engagement between second speed drive gear 32 with second input shaft 22.

As is seen from the time chart of FIG. 5, when, at time "t1", the current vehicle speed becomes to the pre-shift vehicle speed "V" for the 2->1 speed change, releasing movement of first clutch 40a that has been kept fully engaged starts. At time "t2", first clutch 40a becomes fully released, and at time "t3", speed change actuator "A" is energized to move 1–6 shift clutch 230 leftward in FIG. 2 to engage first speed driven gear 41 with output shaft 23.

However, because of the disengaged or released condition of first clutch 40a, the torque transmission from the engine to output shaft 23 is not induced yet.

When, then, at time "t4", the current engine speed lowers to the engine idling speed, releasing movement of second clutch 40b that has been kept fully engaged starts. At this time "t4", the vehicle speed shows a so-called clutch-half-engaged vehicle speed "V2" that would induce a slip condition of second clutch 40b at the second speed.

As is understood from the time chart, the clutch-half-engaged vehicle speed "V2" is lower than the pre-shift vehicle speed "V1" but higher than the clutch engagement vehicle speed "V3".

At time "t5", the engaging capacity of second clutch 40b is held constant to keep the predetermined slip degree of second clutch 40b. Then, at time "t6" when the vehicle speed lowers to the clutch engagement vehicle speed "V3" for the 2->1 speed change, releasing movement of second clutch 40b re-stars toward its fully released condition, and at the same time, engaging movement of first clutch 40a starts. Then, at time "t7", second clutch 40b is fully released and the engaging capacity of first clutch 40a is held at a relatively low level because of absence of depression of the accelerator pedal.

Upon this, the first speed is fully established in the transmission because first clutch 40 takes the engaged condition. It is to be noted that due to the released condition of second clutch 40b, the torque transmission at the second speed is not established.

With passage of time, the vehicle speed lowers and at time "t8" when the vehicle stops, first clutch 40a becomes fully released.

As has been explained hereinabove, when, under a low vehicle speed range with the selected speed being the second speed, the engine speed lowers to a predetermined speed, second clutch 40b starts its engaging operation. Due to this starting of engaging operation of second clutch 40b, undesired engine stall can be avoided even when a rapid engine braking takes place. Furthermore, when the downshift from the second speed to the first speed is under operation, the actual speed change takes place at the time when the vehicle speed lowers to such a level as not to induce an engine howling. Thus, engine noise that would occur at the downshift operation is suppressed or at least minimized and thus conformable downshift operation from the second speed to the first speed is achieved. As is known, once the transmission has taken the first speed, depression of the accelerator pedal provides the vehicle with a rapid acceleration.

As is seen from the time chart of FIG. 5, once the automatic transmission 20 assumes the first speed from the second speed, the engaging capacity of first clutch 40a is held at a relatively low level. Accordingly, even when, due to reduction in vehicle speed, an engine load is applied to the transmission 20 upon engine braking, undesired engine stall can be avoided. That is, upon such engine braking, a suitable slippage takes place in first clutch 40a to dampen a torque transmission shock.

As has been mentioned hereinabove, in the invention, the pre-shift vehicle speed "V1" is provided for 2->1 speed change. That is, when the current vehicle speed lowers to the pre-shift vehicle speed "V1", releasing movement of first clutch 40a that has kept its engaged condition starts, and then, that is, after first clutch 40a is fully released, speed change actuator "A" is energized to operate 1–6 shift clutch 230 to engaged first speed driven gear 41 with output shaft 23. Upon this, the torque transmission path for the first speed is incompletely provided in the transmission 20. Then, when the vehicle speed lowers to the clutch engagement vehicle speed "V3", first clutch 40a becomes engaged with a small engaging capacity. With this, assured and smoothed 2–1 downshift is carried out.

The entire contents of Japanese Patent Application 2003-027728 filed Feb. 5, 2003 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A multistage automatic transmission for use in a motor vehicle, comprising:
   first and second clutches each selectively establishing and disestablishing a torque transmission path from an engine;
   a first input shaft connected to the first clutch and having a first speed drive gear tightly mounted thereon;
   a second input shaft coaxially arranged with the first input shaft and connected to the second clutch, the second input shaft having a second speed drive gear rotatably mounted thereon;
   an output shaft extending in parallel with the first and second input shafts, the output shaft having a first speed driven gear rotatably mounted thereon and a second speed driven gear tightly mounted thereon, the first and second speed driven gears being meshed with the first and second speed drive gears respectively;
   a first shift clutch for uniting the first speed driven gear with the output shaft when actuated;
   a second shift clutch for uniting the second speed drive gear with the second input shaft when actuated; and
   a control system for controlling the first and second clutches and the first and second shift clutches to provide the transmission with a desired speed, the control system providing the transmission with the first speed by engaging the first clutch and actuating the first shift clutch and with the second speed by engaging the second clutch and actuating the second shift clutch,
   wherein the control system comprises:
   a device that issues a vehicle speed signal representative of a vehicle speed; and
   a control unit which is configured to carry out:
   when, upon the transmission assuming the second speed, the vehicle speed represented by the vehicle speed signal becomes equal to or lower than a first predetermined speed, starting operation for fully releasing the engaged condition of the first clutch;
   when thereafter the vehicle speed becomes equal to or lower than a second predetermined speed that is lower than the first predetermined speed, starting operation for releasing the engaged condition of the second clutch; and
   when thereafter the vehicle speed becomes equal to or lower than a third predetermined speed that is lower than the second predetermined speed, starting operation for fully releasing the engaged condition of the second clutch and starting operation for engaging the first clutch from the fully released condition of the same.

2. A multistage automatic transmission as claimed in claim 1, the control unit is configured to further carry out:
   when a predetermined time passes from the time when the vehicle speed becomes equal to or lower than the third predetermined speed, keeping the engaging force of the first clutch at a partial level.

3. A multistage automatic transmission as claimed in claim 2, in which the control unit is configured to further carry out:
   keeping the engaging force of the first clutch at the partial level until the vehicle speed becomes to zero.

4. A multistage automatic transmission as claimed in claim 1, in which the control unit is configured to further carry out:
   when the engaged condition of the first clutch is fully released, actuating the first shift clutch to unite the first speed driven gear with the output shaft.

5. A multistage automatic transmission as claimed in claim 4, in which the control unit is configured to further carry out:
   once the engaged condition of the first clutch is fully released, keeping the fully released condition of the first clutch until the vehicle speed becomes equal to or lower than the third predetermined speed.

6. A multistage automatic transmission as claimed in claim 5, in which the control unit is configured to further carry out:

when a predetermined time passes from the time when the releasing operation of the second clutch starts due to the vehicle speed being equal to or lower than the second predetermined speed, keeping the engaging force of the second clutch at a partial level until the vehicle speed becomes equal to or lower than the third predetermined speed.

7. A multistage automatic transmission for use in a motor vehicle, comprising:

first and second clutches each selectively establishing and disestablishing a torque transmission path from an engine;

a first input shaft connected to the first clutch and having a first speed drive gear tightly mounted thereon;

a second input shaft coaxially arranged with the first input shaft and connected to the second clutch, the second input shaft having a second speed drive gear rotatably mounted thereon;

an output shaft extending in parallel with the first and second input shafts, the output shaft having a first speed driven gear rotatably mounted thereon and a second speed driven gear tightly mounted thereon, the first and second speed driven gears being meshed with the first and second speed drive gears respectively;

a first shift clutch for uniting the first speed driven gear with the output shaft when actuated;

a second shift clutch for uniting the second speed drive gear with the second input shaft when actuated; and a control system for controlling the first and second clutches and the first and second shift clutches to provide the transmission with a desired speed, the control system providing the transmission with the first speed by engaging the first clutch and actuating the first shift clutch and with the second speed by engaging the second clutch and actuating the second shift clutch, wherein the control system comprises:

a device that issues a vehicle speed signal representative of a vehicle speed; and a control unit which is configured to carry out:

when, upon the transmission assuming the second speed, the vehicle speed represented by the vehicle speed signal becomes equal to or lower than a first predetermined speed, starting operation for fully releasing the engaged condition of the first clutch;

when the engaged condition of the first clutch is fully released, actuating the first shift clutch to unite the first speed driven gear with the output shaft;

when thereafter the vehicle speed becomes equal to or lower than a second predetermined speed that is lower than the first predetermined speed, starting operation for releasing the engaged condition of the second clutch; and when thereafter the vehicle speed becomes equal to or lower than a third predetermined speed that is lower than the second predetermined speed, starting operation for fully releasing the engaged condition of the second clutch and starting operation for engaging the first clutch from the fully released condition of the same.

* * * * *